(12) United States Patent
Costes

(10) Patent No.: US 7,977,811 B2
(45) Date of Patent: Jul. 12, 2011

(54) METHOD FOR TRANSMITTING SIGNALS FROM ELECTRONIC HOUSINGS MOUNTED ON THE WHEELS OF A VEHICLE TO A CENTRAL UNIT MOUNTED ON SAID VEHICLE

(75) Inventor: Olivier Costes, Tournefeuille (FR)

(73) Assignee: Continental Automotive France, Toulouse (FR)

( * ) Notice: Subject to any disclaimer, the term of this patent is extended or adjusted under 35 U.S.C. 154(b) by 231 days.

(21) Appl. No.: 12/361,703

(22) Filed: Jan. 29, 2009

(65) Prior Publication Data

US 2009/0190632 A1 Jul. 30, 2009

(30) Foreign Application Priority Data

Jan. 30, 2008 (FR) ...................... 08 00480

(51) Int. Cl.
*B60L 1/00* (2006.01)
(52) U.S. Cl. ........................................................ 307/9.1
(58) Field of Classification Search ................ 307/9.1
See application file for complete search history.

(56) References Cited

U.S. PATENT DOCUMENTS

| 4,390,880 A | 6/1983 | Henoch |
| 6,864,803 B2 * | 3/2005 | Tang et al. ............ 340/870.16 |

FOREIGN PATENT DOCUMENTS

| DE | 102006009899 | 9/2007 |
| EP | 1172237 | 1/2002 |
| JP | 2007237781 | 9/2007 |

OTHER PUBLICATIONS

Priority Search Report dated Sep. 24, 2008, in priority application.

* cited by examiner

*Primary Examiner* — Robert L. Deberadinis
(74) *Attorney, Agent, or Firm* — Young & Thompson

(57) ABSTRACT

A method of transmitting signals from electronic housings, each mounted on one wheel of a vehicle, to a central unit (11) on the vehicle, uses spread spectrum. There is allocated, on the one hand, to each electronic housing (6-9) and to the central unit (11), a first common generic orthogonal spread code (Cg) identical for the electronic housings and the central unit and, on the other hand, to each electronic housing, a second orthogonal spread code (Ci) specific to the electronic housing. An initializing procedure causes the transmission by each electronic housing of a spread signal (e) based on the common generic spread code (Cg), incorporating the second specific orthogonal spread code (Ci) and the identification code (ID) of the electronic housing. Subsequent transmissions include transmission by each electronic housing of a spread signal (e) on the basis of the second specific spread code (Ci) of the electronic housing.

8 Claims, 2 Drawing Sheets

METHOD FOR TRANSMITTING SIGNALS FROM ELECTRONIC HOUSINGS MOUNTED ON THE WHEELS OF A VEHICLE TO A CENTRAL UNIT MOUNTED ON SAID VEHICLE

The invention relates to a method for transmitting from electronic housings, each one of which is mounted on one of the wheels of a vehicle, to a central unit mounted on said vehicle, signals representative of operational parameters of each wheel and furthermore comprising an identification code of the latter.

BACKGROUND OF THE INVENTION

Motor vehicles increasingly have systems for monitoring and/or measuring parameters comprising sensors mounted on said vehicle.

By way of example regarding such systems, mention can be made of systems for monitoring the pressure in the tires comprising sensors mounted on each of the wheels of the vehicle, dedicated to the measurement of parameters, such as the pressure and/or temperature of the tires fitted to those wheels, and intended to inform the driver of any abnormal variation of the measured parameter.

These monitoring systems conventionally comprise:
mounted on each of the wheels of the vehicle, an electronic housing integrating the measuring sensors, a microprocessor and a radio transmitter,
and, mounted on the vehicle, a central unit for receiving the signals transmitted by the electronic housings, provided with a computer integrating a radio receiver connected to an antenna.

In the prior art, JP 2007 237781 A, there is known the use of four RF (radio-frequency) radio receivers, instead of a single one integrated in the central unit, disposed close to each housing and connected electronically to the central unit. These receivers receive the signals transmitted by the housings and retransmit them to the central unit. Such a system has the advantage of not being very sensitive to parasitic noise, but they remain relatively expensive because of the use of four receivers instead of a single one situated in the central unit.

One of the techniques that can be envisaged for the purpose of transmitting signals from electronic housings to the central unit consists in the spread spectrum technique which makes it possible to transmit the signals on a bandwidth several times bigger than the bandwidth of a narrow band signal.

For this purpose, according to this spread spectrum technique, each transmitted signal is spread on the basis of a code which is independent of the transmitted data, a code which is also used, on reception, for "unspreading" (decoding) the signals and allowing the retrieval of the useful data.

Such a spread spectrum technique notably proves to be very insensitive to parasitic noise and very efficient in the presence of multiple paths, these properties advantageously resulting in:
improving the performance of the procedures for location of the electronic housings and therefore reducing the time required by these procedures,
improving the radio-frequency performance during the transmission of signals representing the operational parameters of the wheels.

However, if the communications between each housing and the central unit are all carried out according to the spread spectrum technique using a single identical spread/unspread code and if there is collision between the different messages (which is relatively frequent since there is no synchronization between the times of transmission of the various messages from the wheel units), it then becomes impossible to decode each message sent by the electronic housings and to allocate a predetermined origin to each message (location of each wheel). The impossibility of decoding the received signals makes this type of communication with a single spread code impossible to use.

In order to prevent such collisions, there is known in the prior art, DE 10 2006 009 899, a receiver of radio-frequency waves whose bandwidth is adjustable according to the types of signal it receives. For example, a first type of signal comes from the "hands free" vehicle door opening system, that is to say a system having no key and using a badge transmitting a radio-frequency signal and a second type of signal comes from the tire pressure monitoring system, equipped with the previously described housings. Each of these systems sends RF signals to this receiver by using different bandwidths. In order to receive these signals, the receiver modulates its receiving bandwidth on the basis of vehicle data, which apply to the system which must be activated. Thus, if the vehicle is stationary, the receiver modulates its bandwidth to that of the "hands free" door opening system in order to receive the corresponding signal and, similarly, if the vehicle is moving, the receiver modulates its bandwidth to that of the system for monitoring the pressure in the tires in order to receive the signal from this system. In this way collisions of RF waves between the different systems of the vehicle are avoided. However, such a receiver is not applicable to the tire monitoring system because it does not differentiate between the different sources in the context of one and the same function and consequently it cannot distinguish the signals sent by each one of the housings, because these send their signals when the vehicle is in one and the same condition, that is to say when moving.

On the contrary, if a spread spectrum technique is used with a spread/unspread code that is different for each electronic housing, then it is initially necessary for the central unit mounted on the vehicle to learn all spread/unspread codes of the housings of the vehicle. In this case, the procedure is longer and more complex.

This problem of learning spread/unspread codes could be avoided by using a conventional transmission procedure (RF, LF for example) for transmitting the various spread/unspread codes of each of the housings, and then a spread spectrum procedure for the subsequent transmissions (in order to benefit from the advantages of this type of transmission). However, this would necessitate equipping all vehicles with two different transmission means (one with spread spectrum and one without). The cost of the resultant system would thereby become prohibitive.

SUMMARY OF THE INVENTION

The subject of the present invention is a transmission method using the simplest possible spread spectrum technique, in which the collisions between the messages do not cause any decoding impossibilities for the central unit and using a single type of spread spectrum transmission technique.

For this purpose, the invention relates to a method of transmission from electronic housings, each one of which is mounted on one of the wheels of a vehicle, to a central unit mounted on said vehicle, of signals representative of operational parameters of each wheel and furthermore comprising an identification code of the latter, said transmission method consisting in using, for the transmission of each signal, a spread spectrum technique, and being characterized in that it consists in an preliminary phase, in allocating:
to each electronic housing and to the central unit, a first common generic orthogonal spread code identical for said electronic housings and the central unit,
and, to each electronic housing, a second orthogonal spread code specific to said electronic housing,
in using an initializing procedure consisting in causing the transmission by each electronic housing of a spread signal on the basis of the first common generic spread code, incorporating the second specific orthogonal spread code and the identification code of said electronic housing, in order that the central unit automatically gathers all of the specific codes of the housings present on the vehicle,
then in using a transmission procedure consisting in causing the transmission by each electronic housing of a spread signal on the basis of the second specific spread code of said electronic housing.

According to the invention, all of the successive procedures (the learning of the specific spread codes by the central unit, location of the electronic housings, transmission of the functional parameters of the wheels) use one and the same transmission technique consisting in the spread spectrum technique.

Because of this standardization, all of the transmissions are carried out by means of a single transmission channel, and the overall transmission process thus proves to be simplified to the extreme.

It is recalled that a code is said to be orthogonal when, multiplied by itself, it gives back the original data. Thus the original data is multiplied a first time by an orthogonal code in order to generate the spread spectrum message (in the electronic housing) and is multiplied a second time by this same code in the central unit in order to "unspread" the signal and to obtain the original data again.

According to an advantageous implementation, the second orthogonal spread code specific to each electronic housing consists of a random code generated from the identification code of said electronic housing.

Moreover, each spread signal is advantageously modulated at radio frequency and then integrated in a carrier wave of predetermined frequency.

BRIEF DESCRIPTION OF THE DRAWINGS

Other features, purposes and advantages of the invention will emerge from the following detailed description given with reference to the appended drawings which show a preferred embodiment, by way of non-limiting example. In the drawings.

DETAILED DESCRIPTION OF THE PREFERRED EMBODIMENTS

Figure 1:
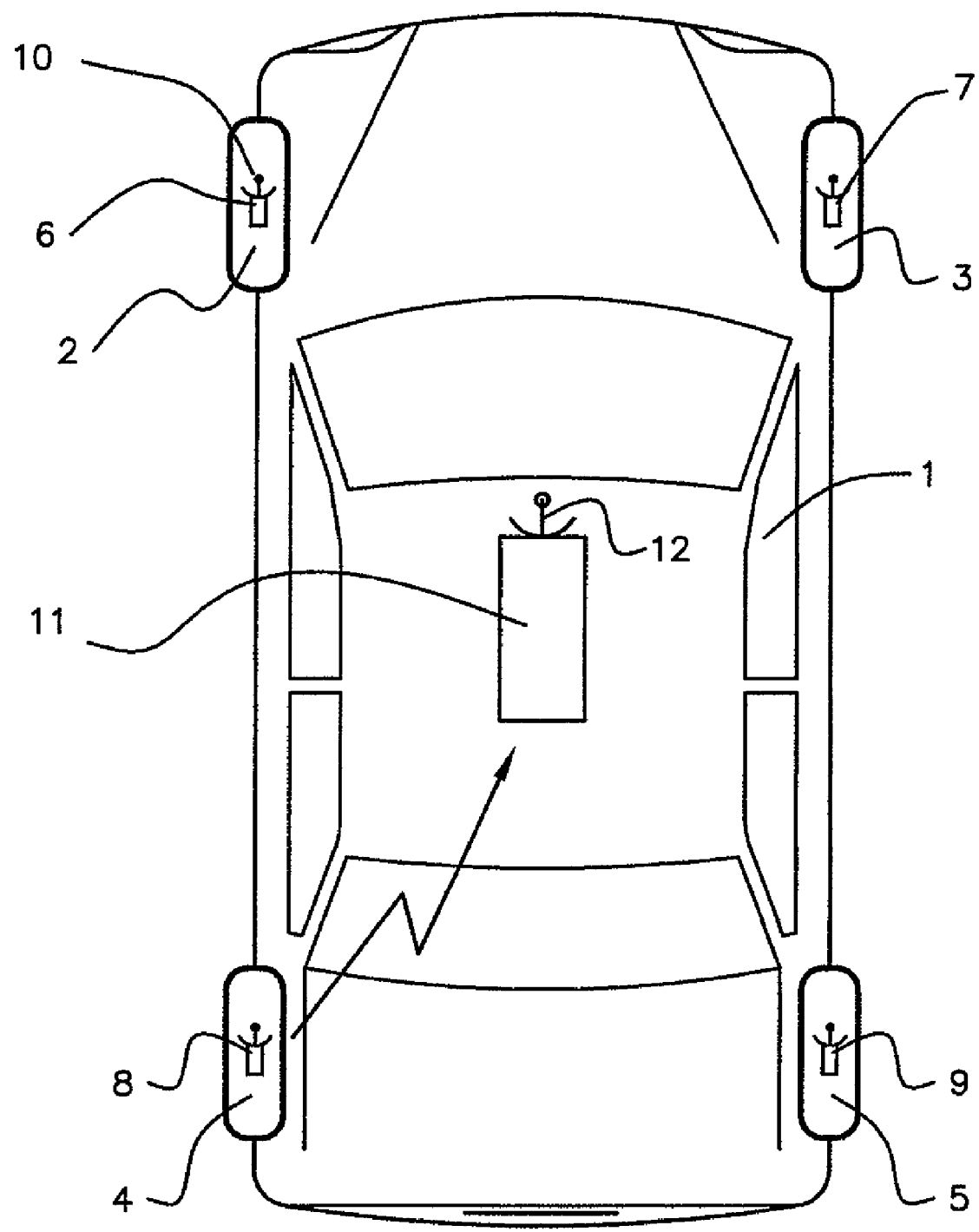
FIG. 1 is a diagrammatic plan view of a vehicle provided with a monitoring system allowing the use of the transmission method according to the invention.

The monitoring system using the transmission method according to the invention is shown, in FIG. 1, installed on a vehicle 1 provided with four wheels 2-5 each conventionally fitted with a pneumatic tire.

Such monitoring systems conventionally comprise, firstly and associated with each wheel 2-5, an electronic housing 6-9, for example integrated with the rim of said wheel in such a way that it is positioned inside the envelope of the pneumatic tire.

Each of the electronic housings 6-9 integrates sensors dedicated to measuring parameters, such as pressure, temperature, acceleration, etc., connected to a microprocessor calculating unit connected to a transmitter connected to an antenna 10.

The monitoring system also comprises a centralized computer or central unit 11 situated in the vehicle 1, comprising a microprocessor and integrating a receiver connected to an antenna 12 able to receive the signals transmitted by each of the four electronic housings 6-9.

In the usual way, such a monitoring system and notably its central unit 11 are designed in such a way as to inform the driver of any abnormal variation in the parameters measured by the sensors associated with the wheels 2-5.

According to the invention, all of the transmissions of signals carried out from the electronic housings 6-9 to the central unit 11 are carried out by the use of the spread spectrum technique.

Figure 2:
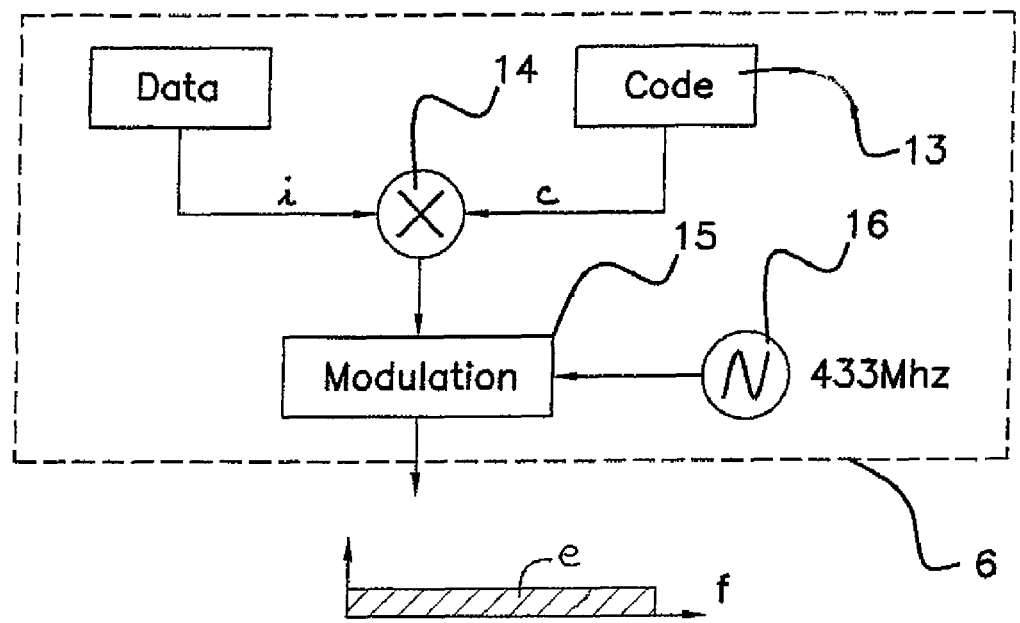
FIG. 2 is a block diagram illustrating the principle of the spread spectrum technique used according to the invention.
Figure 2:
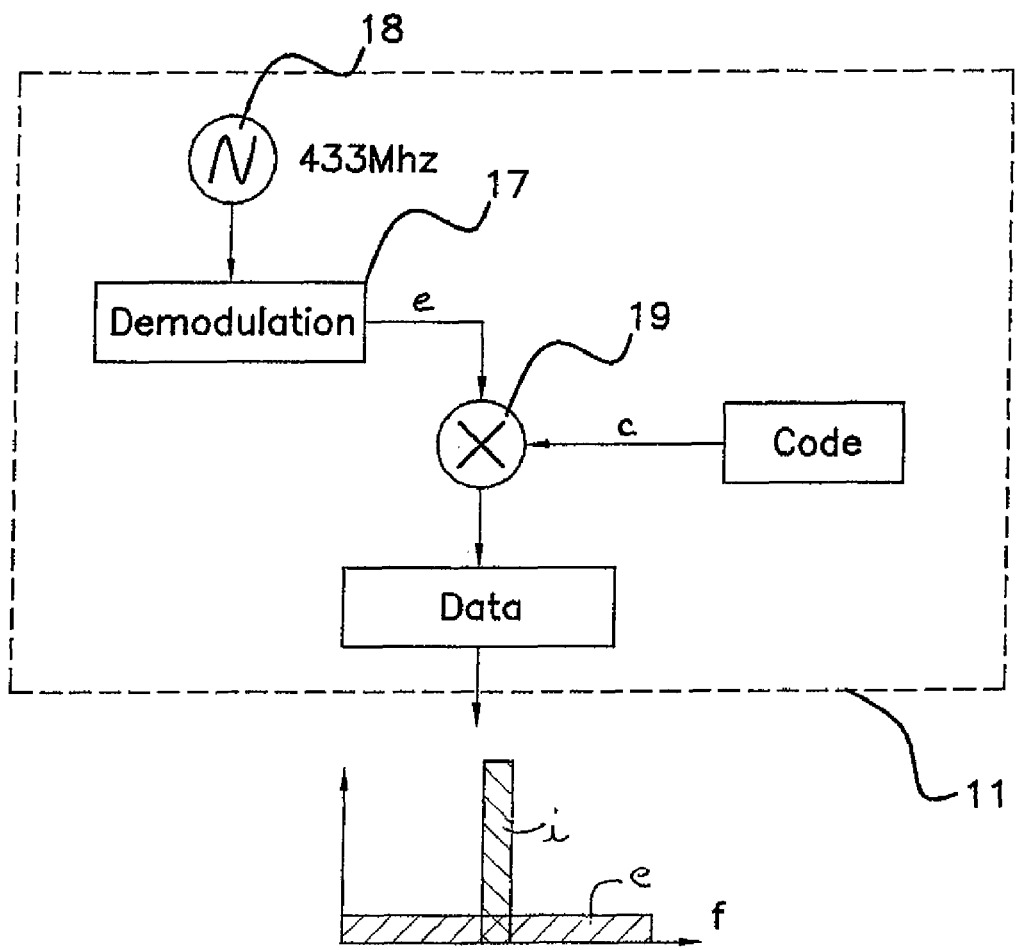

It is recalled that in the case of this spread spectrum technique, the initial message (i), FIG. 2, sent by the wheel unit, is multiplied by a spread code (c) in order to obtain a spread message (e). Thus:

$$i \times c = e$$

This spread message is then received by the central unit 11 and is multiplied a second time by the same spread code (c) in such a way as to obtain the initial message (i) again, because $e \times c = i$. It is recalled that when a so-called orthogonal code is used the multiplication of the spread message (e) by the initial orthogonal code (c) gives the initial message again.

As illustrated in FIG. 2, and firstly for the purpose of implementation of this spread spectrum technique, each electronic housing 6-9 integrates:

an orthogonal spread code generator 13 able to generate said code from the identification code ID of the electronic housing 6-9, for example by means of a known orthogonal random code generation algorithm such as, notably, the WALSH algorithm, successive shift, etc.

a multiplier 14 designed to multiply the data (i) to be transmitted, that is to say the narrow band signal, by the generated random code, and a radio-frequency modulator 15 able to modulate the spread signal at radio frequency, and to integrate the latter in a carrier wave of frequency equal to 433 MHz, for example, generated by an oscillator 16.

For the purpose of implementation of this spread spectrum technique, the central unit 11 itself integrates, in order to allow the retrieval of the data, that is to say their decoding:

a radio-frequency demodulator 17 associated with a 433 MHz oscillator 18, and a multiplier 19 adapted to multiply the demodulated signal by the same random code as that used in the transmitting electronic housing 6-9.

Moreover, for the purpose of implementing the spread spectrum technique, the learning by the central unit 11 of the specific spread codes Ci of the electronic housings 6-9, necessary for the control of the multiplier 19 of said central unit, consists:

in a preliminary phase, in allocating:
to each electronic housing 6-9 and to the central unit 11, a first common generic orthogonal spread code (Cg) which is identical for said electronic housings and central unit,
and to each electronic housing 6-9, a second orthogonal spread code (Ci) specific to said electronic housing and provided by the generator 13,
then in using an initializing procedure consisting in causing the transmission by each electronic housing 6-9 of a spread signal (e) on the basis of the common generic spread code (Cg), incorporating the second specific orthogonal spread code (Ci) and the identification code (ID) of said electronic housing.

Thus, during the preliminary phase, the generic spread code (Cg) (common to all of the wheel units and to the central unit 11) is used so that all of the messages transmitted by the wheel units are received and decoded by the central unit.

Each message received from a wheel unit comprises the specific spread code (Ci) of that wheel unit and its own identifier ID. The central unit then established a list L in which each wheel unit identifier ID is associated with a specific spread code Ci, that is to say in the case of a four-wheel vehicle (C1, C2, C3, C4).

Then, in normal functioning, that is to say as soon as the abovementioned list L is established, the generic spread code Cg is no longer used. Each wheel unit then uses its specific spread code Ci. As the central unit 11 has a list L of these specific spread codes (Ci), it is able to detect any signal received and to associate it with a specified identifier (ID) that it furthermore knows how to locate on the vehicle. The central unit thus knows for example that the front right wheel has the identifier ID1 and transmits its messages with the spread code C1.

The use of a spread spectrum technique for communication between the wheel unit and the central unit makes it possible to reduce this communication's sensitivity to noise.

The generic spread code Cg is used only for the acquisition of the specific spread codes (C1 to C4) or on each switching or change of tire. This generic code can also be used again on each vehicle start-up in order to update the list L of specific codes and of identifiers ID.

The rest of the communications between the wheel units and the central unit are carried out using the specific spread codes (C1 to C4, if the vehicle has four wheels). This makes it possible to solve, besides the problem of sensitivity to parasitic noises, the problem of collisions between messages coming from different wheel units.

Thus, once this learning of the specific codes (C1 to C4) is itself carried out by use of the spread spectrum technique, the subsequent transmissions are also carried out by the use of a spread spectrum technique, notably and advantageously resulting:
in improving the performance of the procedures for locating the electronic housings 6-9 and therefore in reducing the time required by these procedures,
and in improving the radio-frequency performance during the transmission of signals representing operational parameters of the wheels 2-5.

The present invention is not of course limited to the embodiment described above. For example, it is possible to use the generic code periodically to reinitialize the system for monitoring the pressure in the tires regularly.

The invention claimed is:

1. A method of transmission from electronic housings (6-9), each one of which is mounted on one of the wheels (2-5) of a vehicle (1), to a central unit (11) mounted on said vehicle, of signals representative of operational parameters of each wheel (2-5) and furthermore comprising an identification code (ID) of the latter, said transmission method consisting in using, for the transmission of each signal, a spread spectrum technique, and being characterized in that it consists in an preliminary phase, in allocating:
on the one hand, to each electronic housing (6-9) and to the central unit (11), a first common generic orthogonal spread code (Cg) identical for all of said electronic housings (6-9) and the central unit (11),
and, on the other hand, to each electronic housing (6-9), a second orthogonal spread code (Ci) specific to said electronic housing,
in using an initializing procedure consisting in causing the transmission by each electronic housing (6-9) of a spread signal (e) on the basis of the first common generic spread code (Cg), incorporating the second specific orthogonal spread code (Ci) and the identification code (ID) of said electronic housing,
then in using a transmission procedure consisting in causing the transmission by each electronic housing (6-9) of a spread signal (e) on the basis of the second specific spread code (Ci) of said electronic housing.

2. The transmission method as claimed in claim 1, characterized in that the second orthogonal spread code (Ci) specific to each electronic housing (6-9) consists of a random code generated from the identification code (ID) of said electronic housing.

3. The transmission method as claimed in claim 1, characterized in that each spread signal (e) is modulated at radio frequency and then integrated in a carrier wave of predetermined frequency.

4. The transmission method as claimed in claim 2, characterized in that each spread signal (e) is modulated at radio frequency and then integrated in a carrier wave of predetermined frequency.

5. A method of transmission of signals from one or more electronic housings mounted in different locations of a vehicle to a central unit mounted on said vehicle, each of said signals comprising a particular identification code (ID), comprising the steps of:
allocating, to each of the one or more electronic housing and to the central unit, a first common generic orthogonal spread code (Cg) identical for all of the one or more electronic housings and the central unit;
allocating, to each electronic housing, a second orthogonal spread code (Ci) specific to said electronic housing;
following said allocating steps, causing each electronic housing to transmit a spread signal, the spread signal of each electronic housing being based on the first common generic spread code (Cg) and incorporating both the second orthogonal spread code (Ci) specific to said electronic housing and the identification code (ID) of said electronic housing; and
following said causing step, causing the transmission by each electronic housing of a specific spread signal, each of said specific spread signals being based on the second spread code (Ci) specific to said electronic housing.

6. The transmission method as claimed in claim 5, wherein the second orthogonal spread code (Ci) specific to each electronic housing consists of a random code generated from the identification code (ID) of said electronic housing.

7. The transmission method as claimed in claim 5, wherein each spread signal is modulated at radio frequency and then integrated in a carrier wave of predetermined frequency.

8. The transmission method as claimed in claim 6, wherein each spread signal is modulated at radio frequency and then integrated in a carrier wave of predetermined frequency.

* * * * *